United States Patent Office 2,924,530
Patented Feb. 9, 1960

2,924,530

EDIBLE COMPOSITION CONVERTIBLE INTO A STIFF MASS BY AERATION

Harry M. Levin, Philadelphia, Pa.

No Drawing. Application May 26, 1958
Serial No. 737,502

8 Claims. (Cl. 99—144)

My invention is an aerated food product having as its major components a semi-plastic base, a liquid butter fat emulsion and a compressed inert gas. Such composition is a cream salad dressing with a whipped cream appearance in which the entire fat consists of milk fat. In my co-pending application Serial No. 476,831, now Patent No. 2,836,497, I have set forth means whereby an edible composition of vegetable oil and butter fat may be converted by aeration into a stiff mass. In my present application no vegetable oil or egg yolk is used.

In accordance with my present invention, the semi-plastic base consists primarily of vinegar, vegetable gum or starch, and/or milk solids. The semi-plastic base formed from the aforesaid ingredients is preferably mixed with an equal amount of whipping cream and such composition is packaged in a pressure container with an edible gas. When the composition is to be used on a salad, or for other like purposes, it is released through a restricted orifice whereupon the whipping cream becomes whipped and forms small globules which carry within themselves minute particles of the semi-plastic base which has been thinned by the addition of the cream. The aerated food product has a comparatively long life as no vegetable oil or egg yolk is used. The exploded particles of butter fat are fortified by the vegetable gum, starch or milk solids so that there is little tendency for the mass of tiny globules to separate or break down. The vegetable gum and/or starch produces sufficient viscosity to give the composition a firm, semi-plastic body and, in addition, it will buffer the acids as well as serve as a protective colloid to prevent curdling of the cream when it is added to the semi-plastic base.

I have found that a mixture of 20 pounds of vegetable gum of the locust bean type or the carboxy-methyl-cellulose type together with 825 pounds of acidulated water and 235 pounds of sugar and salt when mixed forms a semi-plastic base. This vegetable gum base is then mixed with an equal quantity of heavy cream to form a dressing which is free flowing. The gum base is diluted by the moisture phase of the cream to produce the free flowing characteristic.

The composition is packaged in the ordinary pressure can, having a restricted orifice controlled by a nozzle. Such can is partly filled with my composition and is then filled with an inert edible gas, such as nitrous oxide or the like, under pressure of, say, 90 pounds per square inch at 70° F. The composition may be ejected from such pressure can with a minimum of loss, due to its free flowing characteristic, and when so ejected it forms a semi-permanent mass of tiny globules having physical characteristics analogous to that of whipped cream and having taste characteristics of a cream salad dressing.

I have also found that a mixture of 50 pounds of either cornstarch, wheat starch or arrowroot starch combined with 412 pounds of water and 117 pounds of sugar and salt when mixed with an equal amount (579 pounds) of the vegetable gum base, above described, forms a suitable semi-plastic base which when dispersed in an equal quantity of heavy cream will produce a free flowing dressing suitable for use in a pressure can of the type described.

Instead of the bases above described, I may use a milk base prepared from 250 to 385 pounds of dried defatted milk solids, 825 pounds of acidulated water and 105 to 150 pounds of sugar (depending on the amount of milk used, the greater the milk the lesser the sugar) and 35 pounds of salt to form a suitable semi-plastic base totaling 1260 to 1340 pounds, depending on the amount of milk solids and sugar used. When such a semi-plastic base is mixed with an equal quantity of heavy cream it forms a free flowing cream dressing which is readily whipped when released from the pressure can.

In each example set forth above vinegar is preferably used in forming the acidulated water, in the range of 1.5% to 2.5% in terms of acetic acid by titration. Citric acid, lactic acid or other edible acids may, of course, be used.

When any of the examples of my composition, above described, are aerated by expulsion from the orifice of the pressure can there is formed a semi-permanent cellular mass of microscopic bubbles or globules of butter fat surrounded by the casein of the cream, or by the milk solids of the milk base, which are fortified by the vegetable gum gum or starch. The semi-permanent mass of tiny globules has a density analogous to that of whipped cream. Such a dressing, in which the entire fat consists of milk fat rather than a mixture of vegetable oil and milk fat, has a comparatively long life outside the can and excellent shelf characteristics in the can as there is no possibility of the base breaking down or separating in the can either from freezing or jarring.

The composition may be chilled by refrigeration prior to use not only to prolong the life of the butter fat emulsion but also to inhibit the escape of the gas from the bubbles or globules.

I do not limit the above composition to 50% cream nor do I limit it to any type of heavy cream as I can produce a satisfactory body with a light cream, dependent upon the percentage of fat desired in the end product, if a stabilizer is used. While I have referred to an equal amount of cream and semi-plastic base it is not necessary for the purposes of my invention that the percentages be on a strictly 1 to 1 basis.

Having described my invention, I claim:

1. An edible composition having as its major components a vegetable gum base comprising a mixture of vegetable gum, acidulated water, sugar and salt, an edible butter fat emulsion, and an edible gas under pressure, said composition being free flowing and convertible by aeration into a semi-permanent mass of tiny globules fortified by said vegetable gum, said mass having a density analogous to that of whipped cream.

2. An edible composition having as its major components a base including vegetable gum components and starch paste components, the former comprising a mixture of vegetable gum, acidulated water, sugar and salt and the latter comprising a mixture of starch selected from a group consisting of cornstarch, wheat starch and arrowroot starch, acidulated water, sugar and salt, an edible fat emulsion, and an edible gas under pressure, said composition being free flowing and convertible by aeration into a semi-permanent mass of minute globules fortified by said vegetable gum and said starch having a density analogous to that of whipped cream.

3. An edible composition having as its major components a milk base comprising dried defatted milk solids, acidulated water, sugar and salt, an edible butter fat emulsion, an edible gas under pressure, said composition being free flowing and convertible by aeration into a semi-permanent mass of globules fortified by said milk solids having a density analogous to that of whipped cream.

4. An edible composition having as its major components a vegetable gum base comprising a mixture of vegetable gum selected from the locust bean type and the carboxy-methyl-cellulose type, acidulated water, sugar and salt, an equal quantity of heavy cream, and an edible gas under pressure, said composition containing a total of approximately 20% fat and being free flowing and convertible by aeration into a semi-plastic mass of globules fortified by said vegetable gum and having a density analogous to that of whipped cream.

5. An edible composition having as its major components a milk base comprising dried defatted milk solids, acidulated water, sugar and salt all dispersed in a butter fat emulsion, an edible gas under pressure, said composition being free flowing and convertible into a semi-permanent mass of exploded particles of butter fat surrounded by the casein of the dried defatted milk solids, said mass having an appearance of whipped cream.

6. An edible composition having as its major components an edible base including vinegar, water, and vegetable gum forming a semi-plastic base, an edible butter fat emulsion, and an edible gas under pressure, said composition being free flowing and convertible by aeration into a semi-permanent mass of tiny globules fluffed with said gas and fortified by said vegetable gum, said mass having a density analogous to that of whipped cream.

7. An edible composition having as its major components a semi-plastic base including vinegar, water and an edible starch, an edible butter fat emulsion, and an edible gas under pressure, said composition being free flowing and convertible by aeration into a semi-plastic mass of tiny globules of butter fat fortified by said starch and having physical characteristics analogous to that of whipped cream and having taste characteristics of a cream dressing.

8. An edible composition having as its major components a semi-plastic edible vegetable gum base, a liquid butter fat emulsion having an aqueous continuous phase, and an edible gas under pressure, said composition being free flowing and convertible by aeration into a semi-permanent mass of tiny globules separated by the water phase, said mass having a density analogous to that of whipped cream and fortified by said vegetable gum.

References Cited in the file of this patent

UNITED STATES PATENTS

| | | |
|---|---|---|
| 2,155,260 | Diller | Apr. 18, 1939 |
| 2,170,417 | Levin | Aug. 22, 1939 |
| 2,250,300 | Goosmann | July 22, 1941 |
| 2,264,593 | Schapiro | Dec. 2, 1941 |
| 2,294,172 | Getz | Aug. 25, 1942 |
| 2,435,682 | Getz | Feb. 10, 1948 |
| 2,715,068 | Levin | Aug. 9, 1955 |
| 2,836,497 | Levin | May 27, 1958 |

OTHER REFERENCES

De Guoy: "The Gold Cook Book," published by Greenberg (New York), 1943, pp. 830, 831 and 834.

The Boston Cooking School Cook Book, Fannie Farmer, 1922, p. 326.